May 16, 1933.    C. F. SHADLE    1,909,227
APPARATUS FOR CONDITIONING AIR
Original Filed April 1, 1930    2 Sheets-Sheet 1
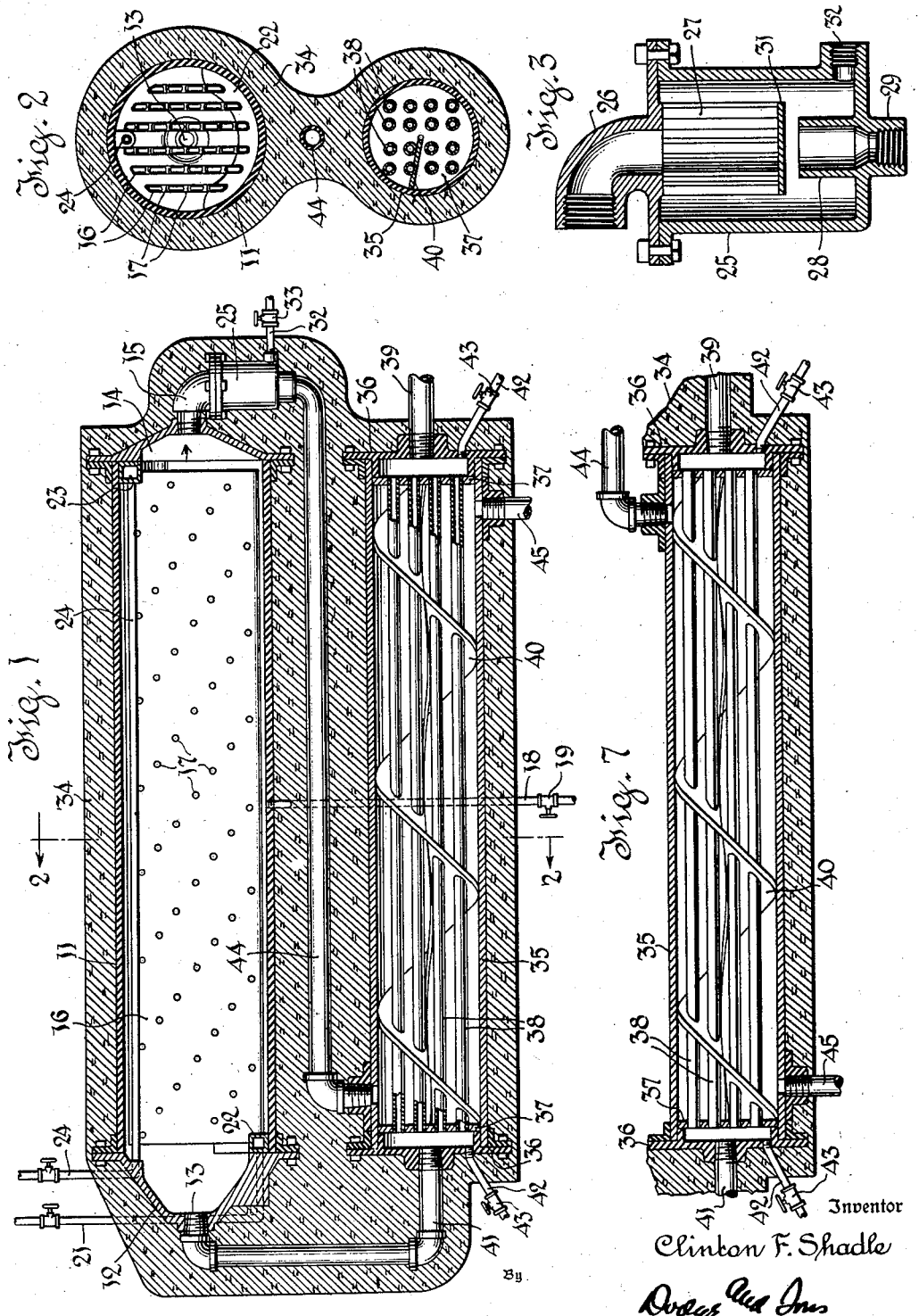
Inventor
Clinton F. Shadle
Attorneys

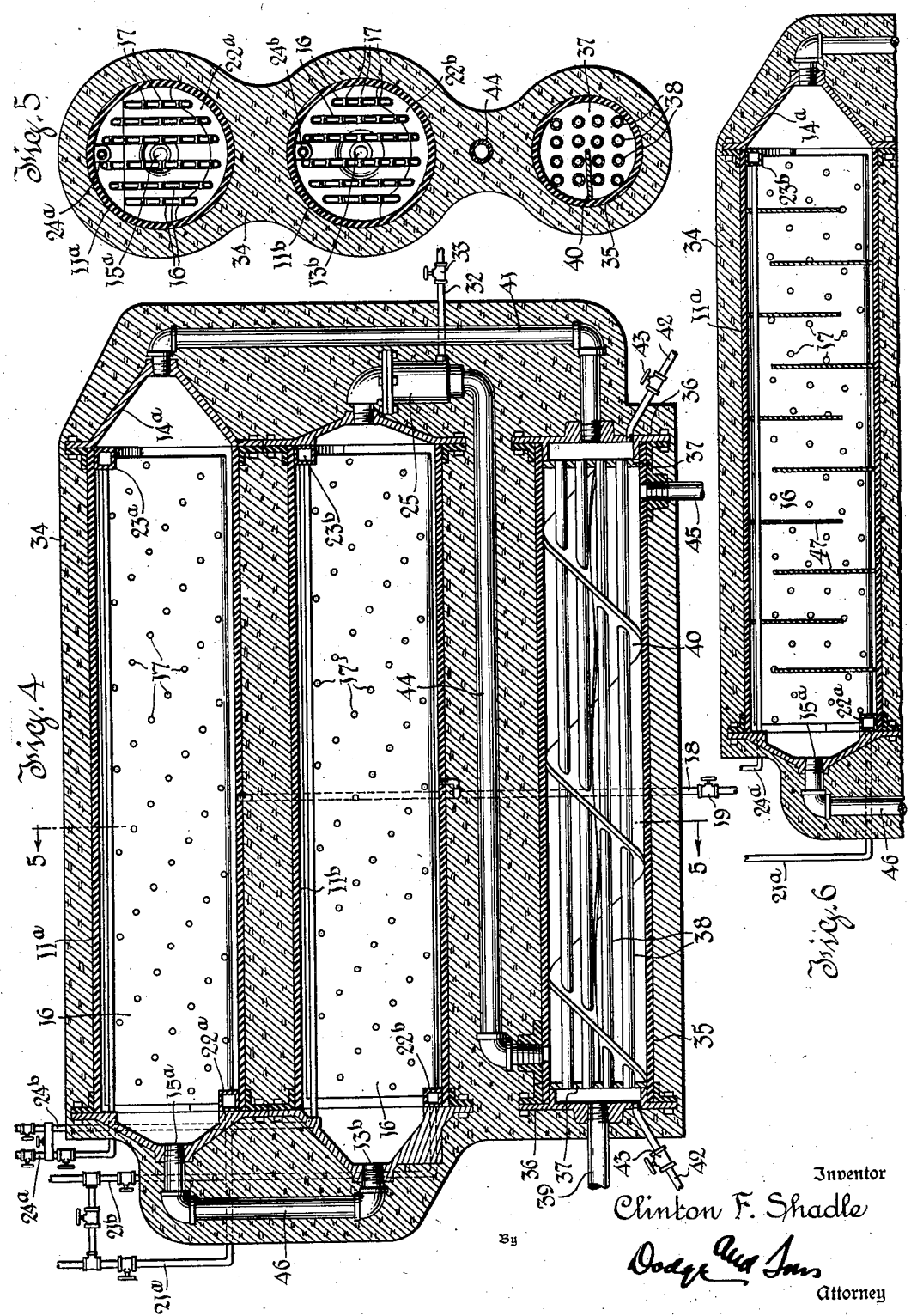

Patented May 16, 1933

1,909,227

UNITED STATES PATENT OFFICE

CLINTON F. SHADLE, OF WATERTOWN, NEW YORK

APPARATUS FOR CONDITIONING AIR

Continuation of applications Serial Nos. 440,809 and 440,810, filed April 1, 1930. This application filed April 11, 1931. Serial No. 529,456.

This invention relates to apparatus for drying gases, and particularly air, for industrial use, and is a continuing application covering the apparatus features of applications Serial Numbers 440,809 and 440,810, filed April 1, 1930, and now limited to methods.

The invention has an extensive field of use in the treatment of compressed air. Compressed air is widely used in industry, and in many of the fields of use, the presence of moisture in substantial quantity entails serious difficulty. For example, in spraying paint by the use of compressed air, serious harm can be done by water sprayed with the air. Unless the compressed air is freed of water, there is a tendency for condensed moisture to accumulate in the system, and when this has accumulated in quantity it may be picked up by the discharging air and become a source of loss and delay.

Compressed air motors are subject to frequent stoppage by frost when used with air not properly freed of moisture. Similarly, in air brakes of various types, the deposition of moisture throughout the system has been a frequent cause of trouble and expense. When atmospheric temperatures fall below the freezing point of water, the possibility that the moisture will freeze and impair or prevent the operation of the brakes, is a source of serious danger. Consequently, any apparatus which will reduce the moisture content of air to a low point, at a commercial rate, and without undue expense, is of substantial economic importance.

There are two physical principles which may be availed of to reduce the moisture content of gases. The total weight of water which will exist as vapor in a given volume is dependent upon vapor pressure which is a function of temperature. The presence or absence of a gas in the volume does not materially affect the weight of water which will exist as vapor, nor does the density of that gas have material effect. Hence, if saturated air, for example, be compressed and if its initial temperature be restored, it will reject moisture, for as the volume is reduced the amount of saturated vapor which can exist at a given temperature is similarly reduced. If the volume and temperature both be reduced from the initial value, it is obvious that a given volume will contain an increasing weight of air and a decreasing weight of moisture, so that the ratio of moisture to air will diminish.

Attempts to avail of these principles on a commercial scale have not, so far as I am advised, secured results which even closely approximate the theoretical possibilities. This is particularly true where efforts are made to reduce the absolute humidity to a very low value.

As the most important field for devices of the character here under discussion is in the dehumidification of air, reference will hereafter be made to air, but with the understanding that the same principles apply to the treatment of gases in general, and that the discussion is illustrative.

In prior art air conditioners reliance has been placed on refrigeration of the air to condense the water vapor mixed therewith. Two general methods of refrigerating the air have been used; one passes the air over tubes or other surfaces which are maintained at a low temperature by refrigerating machines, and contemplates the formation of frost in large quantity; the other subjects the air to contact with sprays of refrigerated water or brine. The latter scheme is not suitable for extremely low temperatures. It has been proposed, particularly in the second type of device, to make use of the so-called eliminators. These ordinarily are merely sheet metal baffles flooded with refrigerated water. Their function is to entrap and remove from the air suspended droplets of water.

Conditioners of the types just mentioned are satisfactory for conditioning air for buildings, for the reason that in such case an extremely low relative humidity is not necessary. Efforts to avail of modified forms of such apparatus to deliver air of low relative humidity, have been subject to the difficulty that the absolute humidity of the delivered air materially exceeded the value corresponding to the temperature attained in the conditioner. Any conditioner in which frost forms in quantity must be shut down periodically for defrosting and is inefficient except when free of frost.

The present invention is based on the discovery that there is a tendency for water condensing from the vapor stage in air, to remain in suspension in the air in the form of droplets which are so minute as to be invisible. These droplets do not precipitate readily, and, consequently, flow with the air through the conditioning device, and are unaffected by conventional eliminators. These minute droplets readily reevaporate upon increase in volume of the air, or upon rise in its temperature, or both. While these droplets are of such a character that they can not be successfully precipitated by conventional eliminators or centrifugal separators, they have an inherent tendency to grow in size if the air be subjected long enough to the low temperature which induces condensation. In this way it is possible to develop the droplets to a size at which they may be eliminated by mechanical means.

Most such mechanical means depend on inertia effects which produce a selective tendency of the heavier water droplets to move out of the air stream and form a water film on surfaces upon which they impinge. As a typical example of such separators there may be mentioned conventional centrifugal separators.

The present invention involves the idea of promoting the growth of the water droplets to a size permitting a mechanical separation of the droplets from the air, and at the same time minimizing the actual contact of the water droplets with the refrigerated surfaces, particularly where those surfaces are cold enough to cause freezing. The droplets are then separated from the air after the air has passed the refrigerating surfaces so that the separation takes place at a point where the tendency toward frost formation or freezing is less than it is adjacent the refrigerating surfaces.

Generally stated, the air is sharply cooled below its dew-point by passing it in proximity to a refrigerated surface or surfaces, and keeping the air, so far as is possible, out of contact with such surfaces. When this is done the minute water droplets commence to form and remain suspended in the air. The droplets grow in size at a rate which rapidly increases because of the rapid increase in surface of each droplet with progressive increase in diameter. Each droplet receives heat from the vapor condensing upon it and radiates that heat to the adjacent refrigerative surface without contact with that surface. If sufficient time be allowed, under the conditions just mentioned, the droplets ultimately attain a size favorable to mechanical separation from the air.

Only those droplets which actually contact the refrigerating surface will deposit as frost on such surface and the invention contemplates that the contact of droplets with any refrigerating surface which is below freezing temperature, will be minimized, so far as practical structural considerations permit. The apparatus is so arranged that when the droplets have reached a size favorable to mechanical separation, and before they commence to precipitate by gravity in any considerable quantity, they enter a mechanical separator and are mechanically removed from the air stream.

It follows that any refrigerative cooler at freezing temperature must be designed to favor the transfer of heat to the refrigerative surface by radiation, and to minimize actual physical contact with the refrigerative surface. Consequently, the form and spacing of the refrigerative units are selected to favor radiation. The velocity of air flow past the refrigerative surfaces is kept at as low a value as is practicable in order to secure nonturbulent flow, or, as close an approximation thereto as is practicable. Turbulence is further minimized by the adoption of stream line forms, to the end that eddying tendencies may be minimized.

In some cases a single refrigerative unit is used. Where extreme dryness is desired it is possible to use a plurality of refrigerated surfaces to which successively the air radiates heat, each successive unit being at a lower temperature than its predecessor. The air leaving the refrigerative unit or series of units, is immediately treated in a mechanical separator to remove the water droplets. The best results so far secured have been had with a separator of the centrifugal type.

Where its use is feasible, economies can be effected by the use of a regenerative heat interchanger in which cold air leaving the moisture separator passes in heat exchanging relation with the warm untreated air flowing to the refrigerative device. There are practical limits to the use of the regenerative interchanger. The untreated air is heavily charged with moisture and the regenerative interchanger, because of its design to secure high heat transfer, is apt to freeze up if the temperatures are below freezing. In such cases a regenerative interchanger should not be used.

Counterflow in such interchanger, while desirable from the standpoint of maximum heat exchange, is often impracticable because of the increased tendency to freeze up. Consequently, in most cases where the regenerative interchanger is used, the flow is concurrent, that is, both air streams flow in the same direction.

The applicability of the invention to different conditions will now be described in connection with the accompanying drawings, which illustrate practical embodiments of the invention, using one or more refrigerative stages and using different types of regenerative heat interchangers.

In the drawings—

Fig. 1 is a vertical longitudinal section of a device having a single refrigerative stage and a regenerative heat interchanger of the counterflow type.

Fig. 2 is a section on the line 2—2 of Fig. 1.

Fig. 3 is a vertical axial section of the moisture separator shown in Fig. 1.

Fig. 4 is a view similar to Fig. 1, but showing a device having two refrigerative stages and a regenerative interchanger of the concurrent flow type.

Fig. 5 is a section on the line 5—5 of Fig. 4.

Fig. 6 is a fragmentary view showing the use of baffles in the air passages in the first refrigerative stage.

Fig. 7 is a fragmentary view showing how the connections of the regenerative interchanger may be reversed in Figs. 1 and 4. Such reversal would change the interchanger of Fig. 1 to the concurrent flow type and would change the interchanger of Fig. 4 to the counterflow type.

Referring first to Figs. 1, 2 and 3:

11 represents a cylindrical shell which has a tapered inlet head 12 with inlet connection 13 and a tapered outlet head 14 with outlet connection 15. The purpose of using the tapered heads is to give a gradual change in section and thus reduce eddying tendencies. The eddying tendencies produce a less disturbing effect at the exit end, and for this reason the exit head 14 is given a wider flare than the entrance head 12 to save space. Where space permits, it is advisable to make the changes in cross section as gradual as possible, because the ideal conditioner would have the closest possible approach to non-turbulent flow through the shell 11.

Mounted in the shell is a cooling element, consisting of a plurality of flat leaves or plates 16. These leaves or plates are hollow, as indicated in Fig. 2, and the opposite walls are braced together against both compressive and expansive stresses, by stays, indicated generally at 17.

It will be understood that the air to be treated, in the illustrated device, will arrive under a pressure of, for example, approximately 150 pounds per square inch and that when the evaporative refrigerating unit is in operation, the suction pressure within the leaves may be quite low. On the other hand, when the compressor is shut down, so that only atmospheric pressure will exist within the shell 11, the refrigerating unit is also likely to be shut down, at which time the vapor pressure in the plates 16 will rise to a substantial value. For this reason the stays 17 should be arranged to resist stresses in both directions.

The edges of the leaves 16 are rounded, so far as possible, as is clearly illustrated in the drawings, and they are spaced above the bottom of the shell 11, as is clearly indicated in Fig. 2 so that whatever moisture is precipitated in the shell 11 will not be in contact with the leaves 16 but will be drained away by the connection 18. The quantity of moisture so precipitated is kept as small as possible because of its tendency to freeze. The connection 18 is shown as equipped with a hand operated valve 19, but it is within the scope of my invention to use automatic valves of any suitable type in place of the valve 19. As these would assume various different forms, according to circumstances, it is deemed sufficient to illustrate any suitable valve, and a hand operated valve can be used to secure the desired result.

While it is within the scope of the present invention to circulate any refrigerative or heat absorbing liquid through the leaves 16, it is considered to be simpler and better to make use of a volatile liquid refrigerant, such, for example, as sulphur dioxide or methyl chloride.

This refrigerant liquid is supplied through a liquid line 21 which leads to a manifold 22. The manifold 22 communicates with all the leaves 16 and the refrigerant is supplied by any suitable known means in such a way as to maintain the leaves 16 substantially flooded with the liquid refrigerant. The vapor evolved in the leaves 16 flows out through a second manifold 23 to which is connected the suction line 24. While the leaves 16 may be maintained at any suitable temperature, dependent on the degree of dryness desired, my invention attains its greatest utility in those cases where the leaves are maintained at temperatures substantially below the freezing point of water.

Air enters at 13 and flows to the right between and around the leaves, giving up its heat by radiation, and, in some degree, by direct conduction to the leaves. Some moisture may be precipitated but the quantity normally is small. The arrangement is favorable to a minimum contact of the moisture laden air with the leaves. In the travel of the air between the leaves its temperature will be greatly lowered by radiation to the leaves, with the result that droplets will form and grow, and by the time the air flows out through the connection 15, will have reached a size such that they may be separated by mechanical means from the air.

The preferred mechanical means is a centrifugal separator, indicated generally by the numeral 25 applied to its case. This is illustrated as connected by an elbow connection 26, which is combined with the cover of the case 25, to the outlet 15. The centrifugal separator comprises a circular series of blades 27 in secant arrangement. Air entering through the elbow 26 and flowing outward between the blades 27, is given a whirling motion within the centrifugal case 25. The droplets which are projected, partly against the blades and partly against the interior surface of the shell 25, coalesce and flow down to the bottom of the shell where they are retained by an annular dam 28 which surrounds the outlet connection 29. The air flows beneath the baffle 31 which connects the lower ends of the blades 27, and over the dam 28 to the outlet 29. The precipitated water is drawn off through the connection 32, which, as shown in Fig. 1, is controlled by a valve 33.

The mechanism so far described is heavily insulated against the entrance of heat, the insulation being shown at 34. In many instances the connection 13 would receive the air coming directly from the compressor or coming from the compressor by way of an atmospheric cooler, and the dried air would be piped from the connection 29 to the point of use. As the air leaving the conditioner is generally too cold for use, economies can be effected by passing the entering air and leaving air in heat exchanging relation with each other. For this reason a regenerative heat interchanger of the shell and tube type is sometimes used, and, like the shell 11 and the separator 25, is enclosed in the main body of insulation 34.

This interchanger comprises a cylindrical shell 35 closed by two heads 36 which are spaced from corresponding tube sheets 37. Expanded into these tube sheets are a plurality of tubes 38 which connect together the spaces intervening between the head 36 and the tube sheet 37 at the two ends of the casing. Air coming from the compressor, either directly or through an atmospheric cooler, enters the interchanger through a connection 39. It flows thence through the tubes 38 and the connection 41 to the connection 13 at the entrance end of the shell 11. Moisture precipitated in the tubes is drawn off through connections 42 which are controlled by valves 43. These valves 43, like the valves 33 and 19, might be controlled automatically, or in any suitable way, so far as the present invention is concerned.

Air leaving the separator through the connection 29 flows by way of pipe 44 to the interior of the shell 35 so as to flow around the outside of the tubes 38, and passes from the shell to a point of use through the connection 45. A spiral baffle 40 directs the flow within shell 35.

The regenerative interchanger shown in Fig. 1 is of the counterflow type, that is, the leaving air flowing around the tubes 38 and the entering air flowing through the tubes 38 flow in generally opposite directions. Concurrent flow can be secured by a simple reversal of the positions of the connections 44 and 45. This is shown in Fig. 7 where the connection 44 is at the right end of the shell 35 and the connection 45 is at the left end.

Regenerative interchangers are known, and interchangers of the concurrent and countercurrent flow types are both known. No novelty is here claimed for the interchanger broadly.

As suggested above, I contemplate the use of a plurality of refrigerative stages instead of the single one shown in Fig. 1, and a structure embodying this idea is shown in Figs. 4 to 6. There are two cases which differ according to whether the first stage is or is not operated below freezing temperature. If the first stage is operated below freezing temperature nonturbulent flow is used as in Figs. 4 and 5. If the first stage is above freezing temperature, baffles 47 are added to give turbulent flow and hence more effective heat transfer, as shown in Fig. 6.

In the drawings the parts of the two refrigerative elements are given the same numerals, as similar parts in Fig. 1, with the subscripts $a$ and $b$, for the purpose of distinguishing the two units.

There is a simple pipe connection 46 from the discharge connection $15^a$ of the first unit to the inlet connection $13^b$ of the second unit. There is a single drain connection 18 with valve 19 which serves both of the shells $11^a$ and $11^b$, and the discharge connection $15^b$ for the second stage leads directly to a separator 25, identical with that already described. The interchanger, when an interchanger is used, is identical with that described above, and the parts are similarly numbered in Figs. 1 and 4. The connections shown in Fig. 4 are for concurrent flow, the inlet and discharge connections being reversed end for end in Fig. 4 relatively to Fig. 1. Counter-flow could be secured in Fig. 4 by reversing the connection 44 and 45, as indicated in Fig. 7.

There are separate suction lines leading from the suction manifold $23^a$ of the first unit and the suction manifold $23^b$ of the second unit. This is to permit the two units to be operated at different suction pressures, and, consequently, at different temperatures. It is immaterial how this difference is effected. Known ways of doing so are to use separate compressors for the two evaporators, or to throttle one suction connection, or to use the dual suction connection system covered by certain patents to Gardner Voorhees, for example, Patent No. 982,463, dated January 24, 1911.

Ordinarily the purpose of using two refrigerative stages in series is to obtain a lower temperature and consequently a lower absolute moisture content. The first unit commonly is at or about freezing temperature, though it may be decidedly below the freezing temperature without danger of undue frosting if the non-turbulent flow characteristics are ensured. The second unit is decidedly below freezing temperature. If the first unit be operated above freezing temperature, staggered baffles 47 are used to ensure that turbulent flow is secured. In such case the use of tapered or conical heads 14ᵃ is not necessary.

The effect of using a plurality of refrigerative stages (two being shown) at temperatures which become progressively lower in the direction of the air flow, is to cool the air economically to a relatively low temperature and to carry this out over a relatively long flow path, so that the water droplets will have an opportunity to grow to the desired size.

In the two stage conditioner, as in the single stage conditioner, the object is to stimulate the growth of water droplets to a size at which they are capable of mechanical separation, and then effect this separation at a point beyond the refrigerative stages, so that the tendency to form frost will be minimized.

The use of the interchanger in the structure of Fig. 4 is subject to exactly the same limitations as is its use in the structure of Fig. 1, but the limitations are more severe, because the exit temperature of the air is lower. Consequently, the average temperature in the interchanger tends to be lower.

It will be observed that the flow in the interchanger is distinctly turbulent in character, the velocity through the tubes being necessarily high and the flow around the tubes being baffled and irregular.

The illustration in the drawings is to a considerable extent diagrammatic, and various changes, to accommodate the apparatus to particular conditions, are contemplated. One of the greatest problems encountered in air brake practice is that imposed by the very limited space available on the locomotive. These requirements have led to the adoption of the leaf type evaporator, and this evaporator is an important factor in success in all installations where space is the controlling consideration.

In apparatus as actually used the air was compressed by a two stage direct acting air pump of the type commonly used in air brake installations, and was delivered by the pump under a pressure of the order of 150 pounds gage. The temperature at discharge approached 500° F. at times. The heat of compression was largely removed by passing the air through an atmospheric cooler composed of a zig-zag pipe exposed to the surrounding air. This cooler delivered the air to the apparatus above described, and the dried air was delivered to the usual receiver, known in air brake practice as a main reservoir. Various different temperatures were maintained in the cooling units, particularly the second.

Strictly non-turbulent flow is difficult, if not impossible to attain, but low lineal velocities are essential, and as the velocity is lowered the desired condition is approached. For commercial use a lineal velocity of about 150 feet per minute, has been found practicable, and at such velocities satisfactory results have been secured.

What is claimed is,—

1. An apparatus for removing water from a mixture of water vapor and a gas, comprising a shell designed to minimize the changes of cross section and to provide gradual changes of cross section where such changes are necessary; inlet and discharge connections at opposite ends of said shell; a refrigerative cooler mounted in said shell comprising a plurality of substantially vertical spaced leaves of approximately stream line form extending in the general direction of flow through said shell; connections for conducting refrigerating fluid to and from said leaves; and a mechanical moisture separator interposed in the path of outflow from said shell.

2. An apparatus for removing water from a mixture of water vapor and a gas, comprising a shell designed to minimize the changes of cross section and to provide gradual changes of cross section where such changes are necessary; inlet and discharge connections at opposite ends of said shell; a refrigerative cooler mounted in said shell comprising a plurality of substantially vertical spaced leaves of approximately stream line form extending in the general direction of flow through said shell; connections for conducting refrigerating fluid to and from said leaves; and a centrifugal moisture separator interposed in the path of outflow from said shell.

3. An apparatus for removing water from a mixture of water vapor and a gas, comprising a shell designed to minimize the changes of cross section and to provide gradual changes of cross section where such changes are necessary; inlet and discharge connections at opposite ends of said shell; a refrigerative cooler mounted in said shell comprising a plurality of substantially vertical spaced leaves of approximately stream line form extending in the general direction of flow through said shell; connections for conducting refrigerating fluid to and from said leaves; a mechanical moisture separator interposed in the path of outflow from said shell; a heat interchanger through which the mixture flowing to said shell and the dried gas leaving said separator pass in heat exchanging relation out of contact with each other; and means for draining precipitated moisture from said interchanger.

4. An apparatus for removing water from a mixture of water vapor and a gas, comprising a shell designed to minimize the changes of cross section and to provide gradual changes of cross section where such changes are necessary; inlet and discharge connections at opposite ends of said shell; a refrigerative cooler mounted in said shell comprising a series of substantially vertical spaced leaves of approximately stream line form extending in the general direction of flow through said shell; connections for conducting refrigerating fluid to and from said leaves; a centrifugal moisture separator interposed in the path of outflow from said shell; a heat interchanger through which the mixture flowing to said shell and the dried gas leaving said separator pass in heat exchanging relation out of contact with each other; and means for draining precipitated moisture from said interchanger.

5. An apparatus for removing water from a mixture of water vapor and a gas, comprising a plurality of shells connected in series with each other, the second of said shells being designed to minimize the changes of cross section and to provide gradual changes of cross section where such changes are necessary; refrigerative coolers one mounted in each of said shells, said coolers each including a plurality of substantially vertical spaced leaves of approximately stream line form extending in the general direction of flow through the shell; connections for conducting refrigerating fluid to and from said leaves, the connections for the leaves in one shell being independent of the connections for the leaves of another shell, whereby the leaves may be operated at characteristically different temperatures in the various shells; and a mechanical moisture separator interposed in the path of outflow from the last shell of the series.

6. An apparatus for removing water from a mixture of water vapor and a gas, comprising a plurality of shells connected in series with each other, each of said shells being designed to minimize the changes of cross section and to provide gradual changes of cross section where such changes are necessary; refrigerative coolers one mounted in each of said shells, said coolers each including a plurality of substantially vertical spaced leaves of approximately stream line form extending in the general direction of flow through the shell; connections for conducting refrigerating fluid to and from said leaves, the connections for the leaves in one shell being independent of the connections for the leaves of another shell, whereby the leaves may be operated at characteristically different temperatures in the various shells; and a mechanical moisture separator interposed in the path of outflow from the last shell of the series.

7. An apparatus for removing water from a mixture of water vapor and a gas, comprising a plurality of shells connected in series with each other, each of said shells being designed to minimize the changes of cross section and to provide gradual changes of cross section where such changes are necessary; refrigerative coolers one mounted in each of said shells, said coolers each including a plurality of substantially vertical spaced leaves of approximately stream line form extending in the general direction of flow through the shell; connections for conducting refrigerating fluid to and from said leaves, the connections for the leaves in one shell being independent of the connections for the leaves of another shell, whereby the leaves may be operated at characteristically different temperatures in the various shells; and a centrifugal moisture separator interposed in the path of outflow from the last shell of the series.

8. An apparatus for removing water from a mixture of water vapor and a gas, comprising a plurality of shells connected in series with each other, each of said shells being designed to minimize the changes of cross section and to provide gradual changes of cross section where such changes are necessary; refrigerative coolers one mounted in each of said shells, said coolers each including a plurality of substantially vertical spaced leaves of approximately stream line form extending in the general direction of flow through the shell; connections for conducting refrigerating fluid to and from said leaves, the connections for the leaves in one shell being independent of the connections for the leaves of another shell, whereby the leaves may be operated at characteristically different temperatures in the various shells; a mechanical moisture separator interposed in the path of outflow from the last shell of the series; a heat interchanger through which the mixture flowing to the first shell of the series and the dried gas leaving said separator pass in heat exchanging relation, out of contact with each other; and means for draining precipitated moisture from said interchanger.

9. An apparatus for removing water from a mixture of water vapor and a gas, comprising a plurality of shells connected in series with each other, each of said shells being designed to minimize the changes of cross section and to provide gradual changes of cross section where such changes are necessary; refrigerative coolers one mounted in each of said shells, said coolers each including a plurality of substantially vertical spaced leaves of approximately stream line form extending in the general direction of flow through the shell; connections for conducting refrigerating fluid to and from said leaves, the connections for the leaves in one shell being independent of the connections for the leaves of another shell, whereby the leaves may be operated at characteristically different temperatures in the various shells; a centrifugal moisture separator interposed in the path of outflow from the last shell of the series; a heat interchanger through which the mixture flowing to the first shell of the series and the dried gas leaving said separator pass in heat exchanging relation, out of contact with each other; and means for draining precipitated moisture from said interchanger.

10. An apparatus for treating air, comprising means defining a passage; a refrigerating unit in said passage and adapted to be maintained near the freezing point of water but above that temperature at which frost will form; baffles in said passage arranged to produce turbulent flow through the passage; means defining a second passage to which the first delivers, said second passage being so defined as to have gradual changes of cross section, where such changes are necessary, to minimize the tendency toward turbulent flow; a plurality of plate-like refrigerating units mounted substantially vertically and in spaced relation in said second passage; a moisture separator to which said second passage delivers; means for draining moisture from both said passages; and means for delivering refrigerating fluid to and withdrawing it from said cooling units.

11. Apparatus for drying air, comprising two refrigerating devices through which the air to be dried passes in series, the first being arranged for turbulent flow and maintained at a temperature near to but slightly above the point at which frost will deposit, and the second being designed for non-turbulent flow and adapted to be maintained at temperatures below the point at which frost tends to form; and a mechanical moisture separator to which the second refrigerating device delivers.

12. Apparatus for drying air, comprising two refrigerating devices through which the air to be dried passes in series, the first being arranged for turbulent flow and maintained at a temperature near to but slightly above the point at which frost will deposit, and the second being designed for non-turbulent flow and adapted to be maintained at temperatures below the point at which frost tends to form, and a centrifugal moisture separator to which the second stage delivers.

In testimony whereof I have signed my name to this specification.

CLINTON F. SHADLE.